US009419715B2

(12) United States Patent
Samsuri et al.

(10) Patent No.: US 9,419,715 B2
(45) Date of Patent: Aug. 16, 2016

(54) SYSTEM AND METHOD FOR INTEROPERATING A RADIO-OVER-FIBER BASED NETWORK IN A FIBER-TO-THE-HOME NETWORK

(71) Applicant: Telekom Malaysia Berhad, W.P. Kuala Lumpur (MY)

(72) Inventors: Norhakimah Md Samsuri, Selangor (MY); Amiza Rasmi, Perlis (MY); Norhapizin Kushairi, Pahang (MY); Mohd Azmi Ismail, Selangor (MY); Romli Mohamad, Selangor (MY)

(73) Assignee: TELEKOM MALAYSIA BERHAD, W.P. Kuala Lumpur (MY)

( * ) Notice: Subject to any disclaimer, the term of this patent is extended or adjusted under 35 U.S.C. 154(b) by 0 days.

(21) Appl. No.: 14/463,283

(22) Filed: Aug. 19, 2014

(65) Prior Publication Data

US 2015/0050026 A1    Feb. 19, 2015

(51) Int. Cl.
*H04B 10/00* (2013.01)
*H04B 10/60* (2013.01)
*H04B 10/2575* (2013.01)
*H04B 10/25* (2013.01)

(52) U.S. Cl.
CPC ...... *H04B 10/25754* (2013.01); *H04B 10/2503* (2013.01)

(58) Field of Classification Search
CPC .................. H04B 10/25754; H04B 10/25759; H04B 10/25753
USPC ..................................................... 398/116, 15
See application file for complete search history.

(56) References Cited

U.S. PATENT DOCUMENTS

| | | | | |
|---|---|---|---|---|
| 5,062,684 A | * | 11/1991 | Clayton | G02B 6/29395 356/480 |
| 5,101,450 A | * | 3/1992 | Olshansky | H04J 14/0298 385/14 |
| 5,239,401 A | * | 8/1993 | Olshansky | G02F 1/0327 385/3 |
| 5,301,058 A | * | 4/1994 | Olshansky | G02F 1/0327 359/246 |
| 5,333,000 A | * | 7/1994 | Hietala | H01Q 3/2676 342/368 |
| 5,390,188 A | * | 2/1995 | Dawson | H04L 43/0847 714/706 |
| 5,442,623 A | * | 8/1995 | Wu | H04J 3/085 370/224 |
| 5,479,082 A | * | 12/1995 | Calvani | G02F 1/093 385/24 |
| 5,509,093 A | * | 4/1996 | Miller | G02B 6/241 385/137 |
| 5,539,559 A | * | 7/1996 | Cisneros | H04L 12/5601 370/414 |

(Continued)

*Primary Examiner* — Oommen Jacob
(74) *Attorney, Agent, or Firm* — Cesari and McKenna, LLP (57) ABSTRACT

The present invention relates to a system for interoperating a full-duplex radio-over-fiber (RoF) network in a fiber-to-the-home (FTTH) network and to a method associated with the system. The system comprises, at the central station (100), a laser diode (105*a*), a first optical circulator (105*b*), an optical carrier generating unit (105*c*), and a second optical circulator (105*d*). The system comprises, at a base station (101), a third optical circulator (101*a*) a band pass filter (101*b*) coupled to the third optical circulator (101*a*) and configured to select only the optical signal having a corresponding pass band in which is used for converting an uplink signal as a remote local oscillator signal. The unselected optical signal is transmitted as downlink data.

19 Claims, 7 Drawing Sheets

(56) References Cited

U.S. PATENT DOCUMENTS

| | | | | |
|---|---|---|---|---|
| 5,600,466 A * | 2/1997 | Tsushima | H04J 14/0212 | 398/1 |
| 5,717,795 A * | 2/1998 | Sharma | H04B 10/506 | 385/16 |
| 5,784,184 A * | 7/1998 | Alexander | H04J 14/02 | 398/58 |
| 6,118,566 A * | 9/2000 | Price | H04J 14/0298 | 398/1 |
| 6,895,185 B1 * | 5/2005 | Chung | H04B 10/272 | 398/115 |
| 7,773,883 B1 * | 8/2010 | Weng | H04J 14/0208 | 398/3 |
| 8,027,589 B2 * | 9/2011 | Song | H04B 10/25758 | 398/115 |
| 8,301,034 B2 * | 10/2012 | Chen | H04B 10/516 | 398/183 |
| 8,311,415 B2 * | 11/2012 | Lin | G02F 1/2255 | 398/161 |
| 8,744,262 B2 * | 6/2014 | Barnard | H04B 10/572 | 398/49 |
| 8,923,702 B2 * | 12/2014 | Wan | H04B 1/28 | 398/115 |
| 8,934,788 B2 * | 1/2015 | Cavaliere | H04B 10/2587 | 398/183 |
| 9,065,964 B1 * | 6/2015 | Mutalik | H04N 21/61 | |
| 9,143,231 B2 * | 9/2015 | Yu | H04B 10/11 | |
| 2005/0084262 A1 * | 4/2005 | Oberg | H04B 10/032 | 398/19 |
| 2008/0063397 A1 * | 3/2008 | Hu | H04J 14/0282 | 398/43 |
| 2008/0075464 A1 * | 3/2008 | Maleki | G02B 6/29341 | 398/85 |
| 2008/0279559 A1 * | 11/2008 | Yu | H04B 10/25758 | 398/118 |
| 2009/0316609 A1 * | 12/2009 | Singh | H04B 7/2609 | 370/280 |
| 2010/0215368 A1 * | 8/2010 | Qian | H04J 14/0282 | 398/67 |
| 2011/0069964 A1 * | 3/2011 | Yu | H04B 10/90 | 398/130 |
| 2012/0288286 A1 * | 11/2012 | Houtsma | H04B 10/613 | 398/202 |
| 2013/0028551 A1 * | 1/2013 | DeSalvo | H03H 2/003 | 385/2 |
| 2015/0050026 A1 * | 2/2015 | Samsuri | H04B 10/25754 | 398/116 |

* cited by examiner

SYSTEM AND METHOD FOR INTEROPERATING A RADIO-OVER-FIBER BASED NETWORK IN A FIBER-TO-THE-HOME NETWORK

CROSS-REFERENCE TO RELATED APPLICATIONS

The present application claims the benefit of Malaysian Application No. PI 2013003070 filed on Aug. 19, 2013. The content of the prior application is hereby incorporated by reference in its entirety.

BACKGROUND OF THE INVENTION

1. Field of the Invention

The present invention relates generally to radio-over-fiber based networks. More particularly, the present invention relates to a system for interoperating a full-duplex radio-over-fiber network in a fiber-to-the-home network and to a method associated with the system.

2. Background Information

For the future provision of broadband and other multimedia services over wireless media, current trends in cellular networks are to reduce cell sizes to accommodate more users, and to operate in the microwave or millimeter wave frequency bands to avoid spectral congestion in lower frequency bands. Such scenario demands a large number of base stations to cover a service area which shall involve relatively high costs. The scenario has led to the development of system architecture where functions such as routing or processing, handover and frequency allocation are carried out at a central or control station instead of the base station. This development allows sensitive equipment to be located in safer environment and enables cost of expensive components to be shared among other base stations.

Wireless networks based on radio-over-fiber (RoF) technologies have been proposed as a promising cost-effective solution to meet ever increasing user bandwidth and wireless demands. The RoF involves a transmission of radio signals over fiber with simple optical-to-electrical conversion and radiation via remote antennas that is connected to the central station. In the RoF, the base station has no processing means or functions as the base station is used to convert optical signal to wireless one and vice versa.

The high data rate and broadband demands of wireless and wired-line networks have rapidly increased in recent years. The RoF and fiber-to-the-home (FTTH) systems are promising candidates which one of the concerns is to transmit both radio-frequency and baseband signals on a single wavelength over a single fiber. However, simultaneous modulations and transmissions of the signals which produce a hybrid resulting signal suffer from many drawbacks such as performance fading and failure to interoperate within the FTTH system.

The typical prior art approach includes to incorporate optical couplers for diverting the received millimeter wave (mm-wave) signal into multiple transmission paths, or sometimes referred to as optical reused carrier. US Patent No. 2011/0069964 describes an optical single sideband mm wave generation for optical wireless network where an intensity modulator is employed at each of the base stations so as to produce the optical mm-wave carrier with double of the local oscillator frequency. The prior art fails to anticipate a system which utilizes a RoF network that is interoperated within a FTTH network.

A need therefore exists for providing an improved system and method for interoperating or integrating the RoF network over the FTTH network. Thus, the present invention seeks to provide a system for communication between a radio-over-fiber based network and a fiber-to-the-home network and a method associated with the system.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

Accordingly, the present invention provides a system for communication between a radio-over-fiber (RoF) based network and a fiber-to-the-home (FTTH) network. The system which is interoperated in any FTTH system comprises a central station and a base station connected to the central station by an optical link. The system further comprises an optical line terminal, an optical network unit, and optical splitter.

In one preferred embodiment, the central station according to the system comprises a laser diode, a first optical circulator, a second optical circulator, and an optical carrier generating unit. The laser diode is configured for generating a laser optical signal. The first optical circulator which is coupled to the laser diode is configured to circulate the laser optical signal and a downlink optical signal received by the central station. The optical carrier generating unit which is coupled to the first optical circulator is configured to generate an optical carrier for each of the optical signals. The second optical circulator which is coupled to the optical carrier generating unit is configured to circulate the optical signals and/or the optical carrier for transmission through the optical link. The central station further comprises a band pass filter which is disposed between the laser diode and the first optical circulator is configured to allow only the laser optical signal to pass by.

In another preferred embodiment, the base station comprises a third optical circulator and a band pass filter. The third optical circulator is optically connected to the optical link. The band pass filter which is coupled to the third optical circulator is configured to select only the optical signal having a corresponding pass band in which is used for converting an uplink signal. The unselected optical signal is transmitted as downlink data. The base station further comprises a first photo detector, a low noise electrical amplifier, an electrical mixer, and a modulator or laser diode for direct modulation. In the system, the base station comprises a second photo detector which is coupled to the third optical circulator is configured to convert the downlink optical signal to a downlink electrical signal, and a power amplifier to receive and amplify the downlink electrical signal, a plurality of electrical filters, an electrical diplexer, and an antenna unit.

The optical carrier generating unit comprises a polarization controller, a Mach-Zender modulator, a power splitter, a phase shifter, and a broadband optical amplifier. Preferably, the laser optical signal and the downlink optical signal have different wavelengths.

In yet another preferred embodiment, the first optical circulator is a four-port optical circulator. The second optical circulator is a three-port optical circulator. The third optical circulator is a four-port optical circulator.

In accordance with another aspect of the present invention, a method of operating the RoF based network in the FTTH network is disclosed. The method comprises the steps of receiving a downlink optical signal; providing a laser optical signal at a wavelength different than that of the downlink optical signal; generating an optical carrier for each of the optical signals; converting an uplink signal to an intermediate frequency using the laser optical signal; and transmitting the downlink optical signal.

It is an advantage of the present invention to provide an improved system for communication using the RoF that is interoperable with any FTTH network while maintains the existing FTTH system. Furthermore, the system is relatively simple to assemble, easy to install and use, and comparatively cost efficient.

It is another advantage of the present invention to provide an improved system that provides an optical carrier for downlink wireless data transmissions. The system also provides an additional optical carrier or a remote optical oscillator signal generated at the central station for uplink wireless data transmissions. The remote optical oscillator signal avoids the needs for radio frequency local oscillator for down conversion at each of the remote antenna units.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

A more complete appreciation of the invention and many of the attendant advantages thereof will be readily as the same becomes better understood by reference to the following detailed description when considered in connection with the accompanying drawings, wherein.

It is noted that the drawings may not be to scale. The drawings are intended to depict only typical aspects of the invention, and therefore should not be considered as limiting the scope of the invention. In the drawings, like numberings represent like elements between the drawings.

DETAILED DESCRIPTION OF AN ILLUSTRATIVE EMBODIMENT

In the following description, for purposes of explanation, numerous details are set forth, such as flowcharts and system configurations, in order to provide an understanding of one or more embodiments of the present disclosure. However, it is and will be apparent to one skilled in the art that these specific details are not required in order to practice the present disclosure.

The present disclosure aims to provide a system for communication between a radio-over-fiber (RoF) based network and a fiber-to-the-home (FTTH) network. Preferably, the system is capable to utilize the RoF network which interoperates in any FTTH network or architecture while maintaining the existing FTTH system. The present disclosure aims to provide a method of operating the RoF network in the FTTH network.

Figure 1:
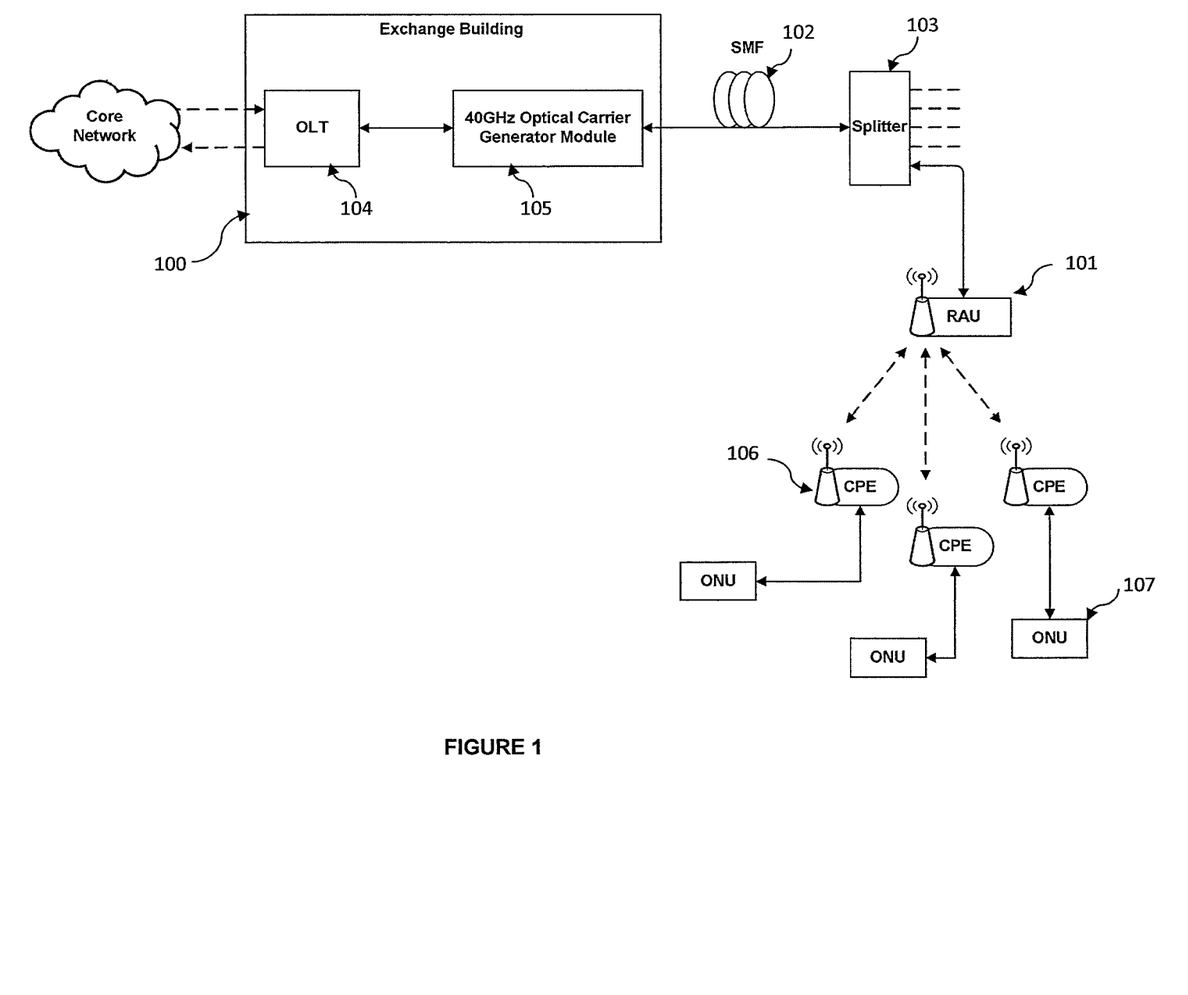
FIG. 1 shows the component architecture of a full duplex radio-over-fiber network in a fiber-to-the-home network.

FIG. 1 illustrates the components architecture of the full duplex RoF network ("RoF") in the FTTH network ("FTTH") which defines the system for communicating therebetween. The full duplex RoF refers to a communication channel that carriers data or signal in both directions. The system comprises a central station 100, a base station 101 and an optical link 102 that connects the central station 100 and the base station 101. The central station 100 comprises an optical line terminal 104 and an optical carrier generator module 105. Preferably, the optical line terminal 104 is in communication with a core network in the system. The core network is the central part of a telecommunication network that provides various services to customers who are connected by the access network. The optical line terminal 104 is coupled to the optical carrier generating unit 105 and both components 104 105 are located, preferably, in an exchange building. It is preferred that the optical carrier generating unit 105 is a 40 GHz optical carrier generating unit.

The optical link 102, for example, can be a single mode fiber which is configured for data or signal transmission between the central station 100 and the base station 101. The system further comprises an optical splitter 103 which is coupled to the optical link 102. The optical splitter 103 is adapted to divide the data or signal transmission into a number of the base station 101. The base station 101 may also be referred to as a remote antenna unit. The data or signal from the remote antenna unit is next transmitted to an equipment 106 in a premise, or a customer-premises equipment (CPE). From the CPE 106, the data or signal is transmitted to an optical network unit 107. The optical network unit 107 which is connected to the CPE 106 is adapted to transmit an uplink signal to the central station 100. The optical line terminal, 104, on the other hand, transmits a downlink optical signal to the base station 101. An antenna is disposed at each of the base station 101 and/or the CPE 106.

Figure 2:
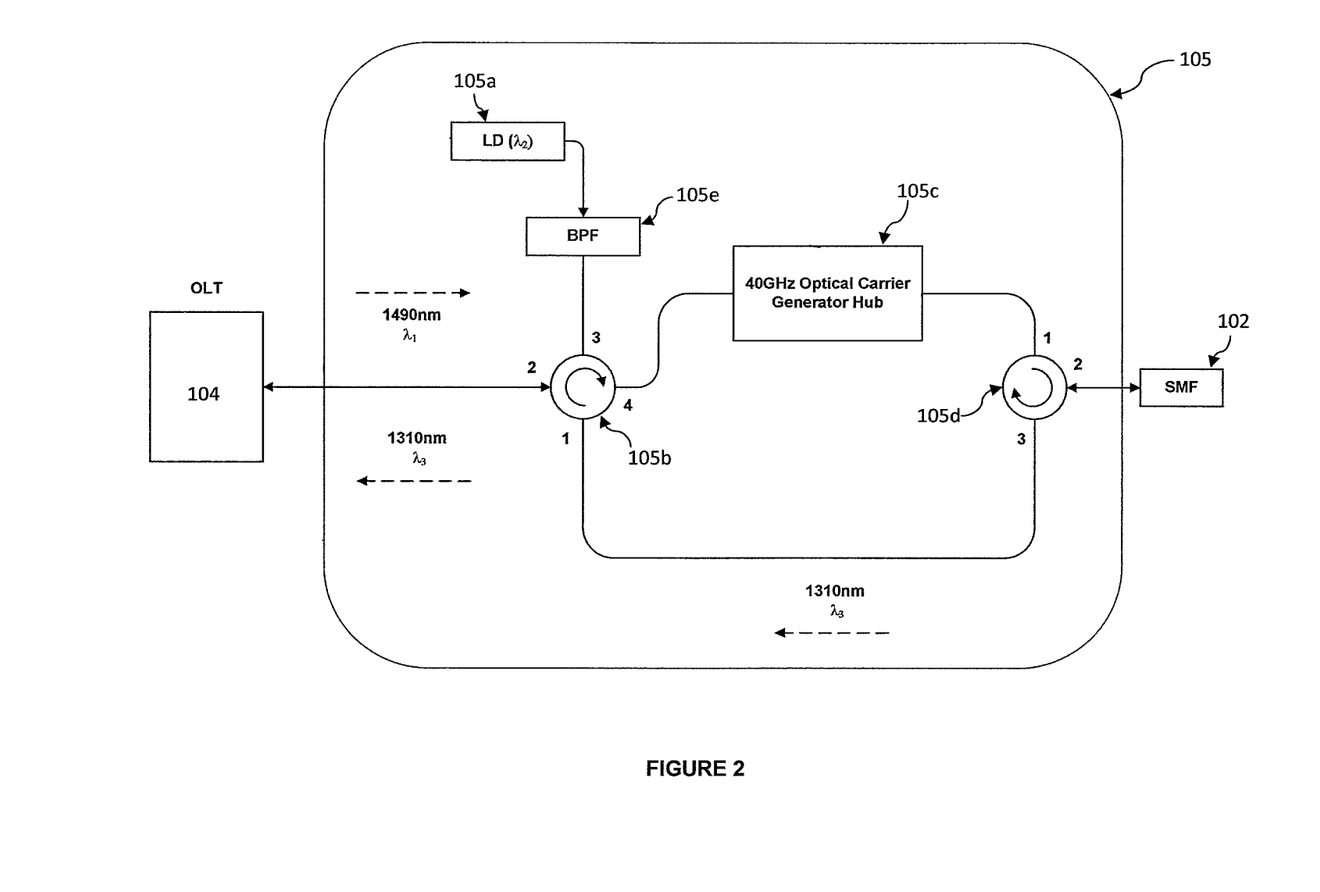
FIG. 2 depicts the component of the central station according to the present invention.

At the central station 100 or the exchange building, the optical line terminal 104 transmits the downlink optical signal to a first optical circulator 105b positioned in the optical carrier generator module 105, as shown in FIG. 2. The first optical circulator 105b is a four-port optical circulator that comprises a first port, a second port, a third port and a fourth port. Preferably, the downlink optical signal is being transmitted to one of the ports of the first optical circulator 105b. The downlink optical signal, for example, has a wavelength of 1490 nm and can be denoted as λ1. The downlink optical signal, for example, enters the second port and exits at the third port. At the third port, the downlink optical signal is filtered by a band pass filter 105e. The band pass filter 105e is configured to restrict the downlink optical signal having λ1, but allows a laser optical signal generated by a laser diode 105a to pass. The laser optical signal, preferably, has a wavelength λ2 that is different than the wavelength λ1 of the downlink optical signal. The laser optical signal is preferably used for remote optical oscillator generation at the base station 101. Upon optically filtered at the band pass filter 105e, the downlink optical signal is retransmitted to the first optical circulator 105b via the third port. It is preferred that the laser optical signal is also transmitted to the first optical circulator 105b via the third port. The optical signals—comprises the downlink optical signal and the laser optical signal exit at the fourth port of the first optical circulator 105b and being transmitted to an optical carrier generating unit 105c. An optical carrier for each of the optical signals is generated by the optical carrier generating unit 105c. Preferably, the optical carrier is a 40 GHz millimeter wave carrier. Subsequently, the optical signals and the optical carriers are being transmitted to a second optical circulator 105d for transmission to the base station 101 via the optical link 102. Preferably, the second optical circulator 105d is a three-port optical circulator.

Figure 3:
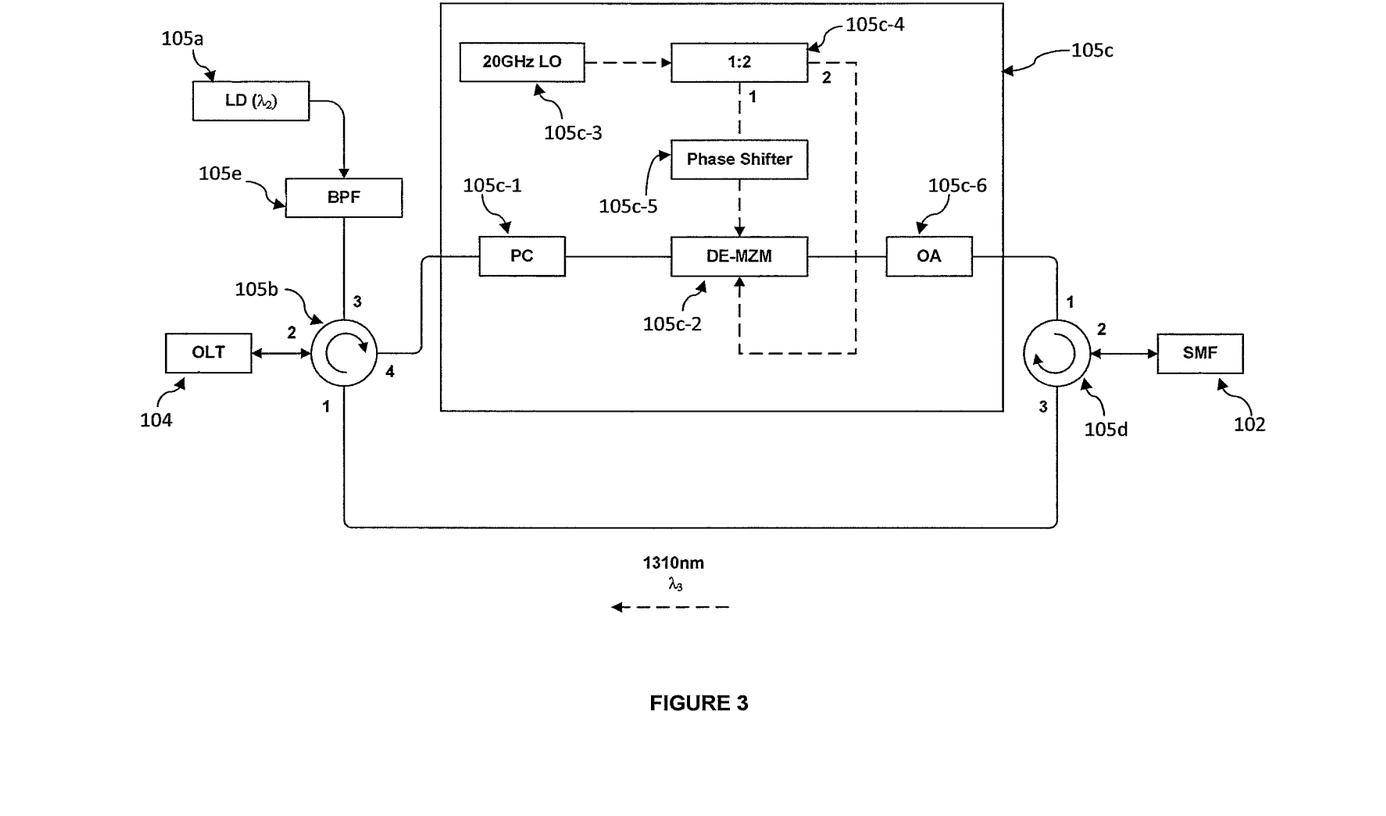
FIG. 3 shows the components of the optical carrier generating unit in the central station.
Figure 4A:
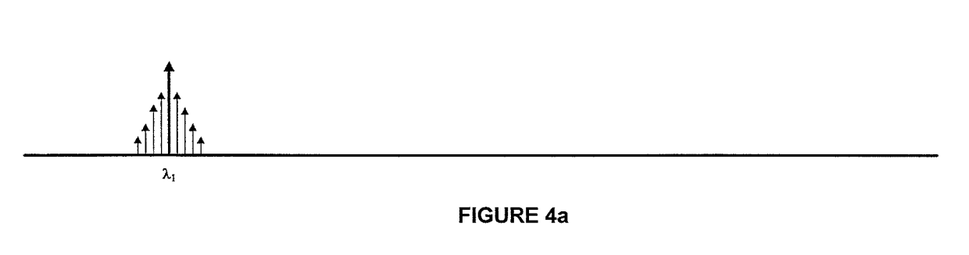
FIG. 4 depicts a series of modulated optical spectrums (FIGS. 4a to 4c) that illustrate the optical signals and the optical carrier.
Figure 4B:
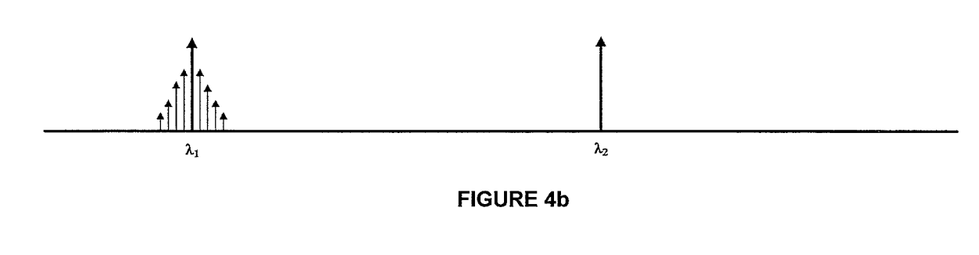
Figure 4C:
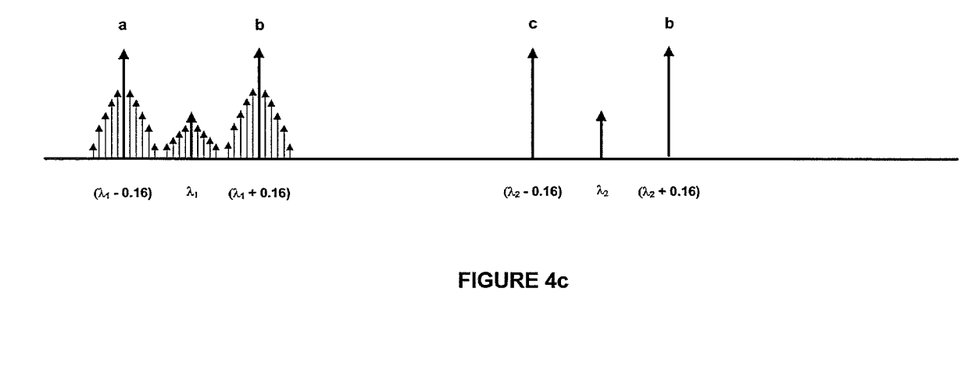

FIG. 3 shows the optical carrier generating unit 105c which comprises a polarization controller 105c-1 and a Mach-Zender modulator 105c-2. The polarization controller 105c-1 is configured to adjust polarization state of the optical signals. The Mach-Zender modulator 105c-2 which is preferably a dual electrode Mach Zender modulator is employed to provide modulation of the optical signals with a local oscillator signal that is generated by a local oscillator 105c-3. The local oscillator 105c-3 may be a 20 GHz local oscillator. The local oscillator signal provided by the local oscillator 105c-3 is divided to two channels at a ratio of 1:2 by a power splitter 105c-4. One of the two channels is connected to a phase shifter 105c-5 and configured for phase-shifting the said optical signals. And the other channel is connected to the Mach-Zender modulator 105c-2. A broadband optical amplifier 105c-6 is adapted into the optical carrier generating unit 105c so as to optically amplify the optical signals received from the Mach-Zender modulator 105c-2 prior being transmitted to one of the ports of the second optical circulator 105d. FIG. 4a shows a modulated optical spectrum with 2.5 Gbps data rate for the downlink optical signal having the wavelength $\lambda 1$ which is transmitted by the optical line terminal 104. Upon propagation from the third port to the fourth port of the first optical circulator 105b, the laser optical signal of the wavelength $\lambda 2$ generated by the laser diode 105a is incorporated therein with the downlink optical signal as shown via the spectrum in FIG. 4b. FIG. 4c, on the other hand, envisages a spectrum comprises the optical signals and the carriers as a result of the phase shifting, modulation and amplification in the optical carrier generating unit 105c. From FIG. 4, the downlink optical signal and the laser optical signal are suppressed at a level and exhibits an increased in signal sideband. The total wavelength separation between the signal sidebands is about 0.32 nm (or equivalent to 40 GHz in RF) as can be seen from a to b, and from c to d in FIG. 4c.

Figure 5:
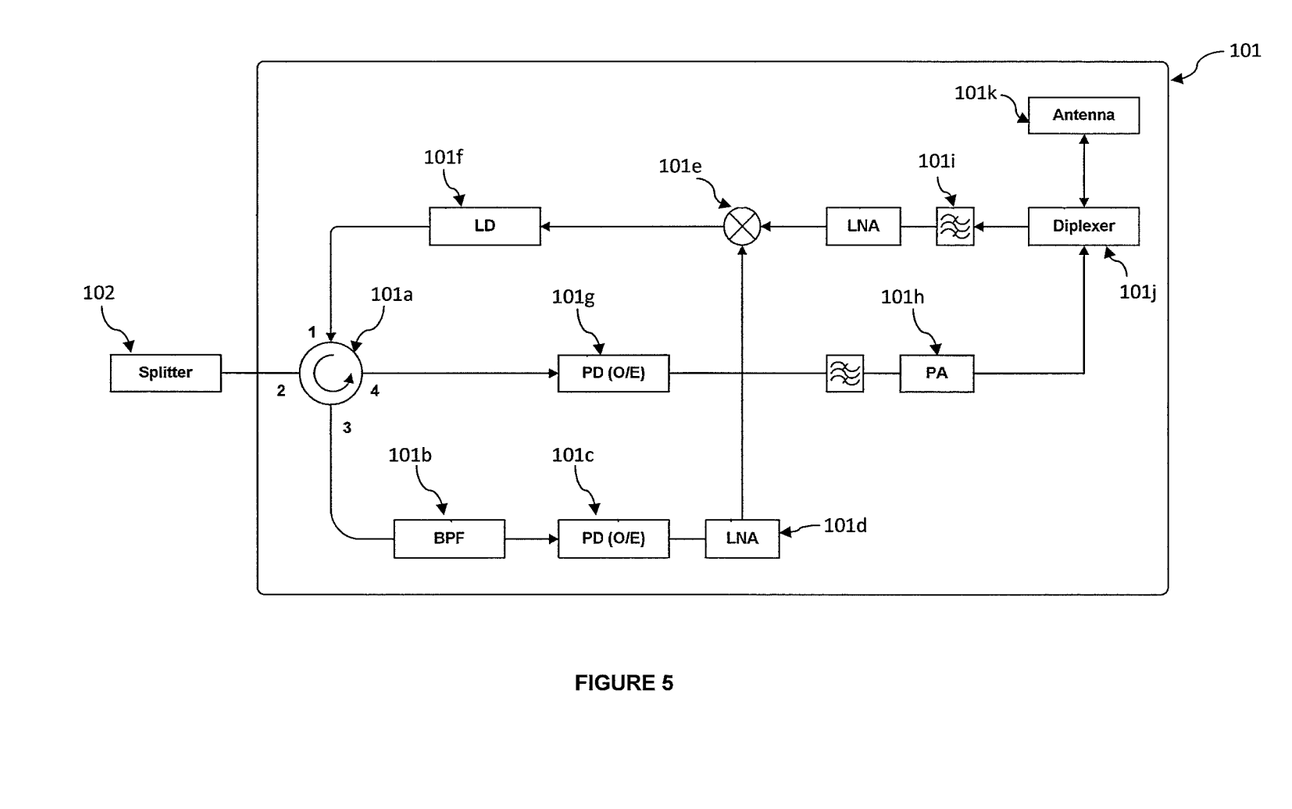
FIG. 5 shows the component architecture of a remote antenna unit according to the present invention.

At the base station 101 or the remote antenna unit, the optical signals and the optical carriers are received at a third optical circulator 101a. Preferably, the third optical circulator 101a is a four-port optical circulator which comprises a first port, a second port, a third port and a fourth port. More preferably, the optical signals and the optical carriers is received at the second port and exit at the third port of the third optical circulator 101a. A band pass filter 101b is coupled to the third port and configured to select only the optical signal which has a corresponding pass band. Preferably, the said optical signal is the laser optical signal. The said optical signal is subjected to a first photo detector 101c for conversion to a laser electrical signal. A low noise electrical amplifier 101d is connected to the first photo detector 101c such that the laser electrical signal is sufficiently amplified before being mixed with the uplink signal in an electrical mixer 101e. The uplink signal from an antenna 101k which is received by a diplexer 101j and being filtered by an electrical filter 101i, is converted to an intermediate frequency upon mixing with the laser electrical signal as the remote local oscillator. The uplink signal is also filtered to reduce noise in the signal using another low noise electrical amplifier. The intermediate frequency is converted to an uplink optical signal via a modulator 101f. The modulator 101f is preferably a laser diode that is configured for direct modulation of the intermediate frequency. The uplink optical signal is next transmitted to the third optical circulator 101a via the first port for transmission to the central station 100. Preferably, the uplink optical signal has a wavelength of $\lambda 3$.

Figure 6:
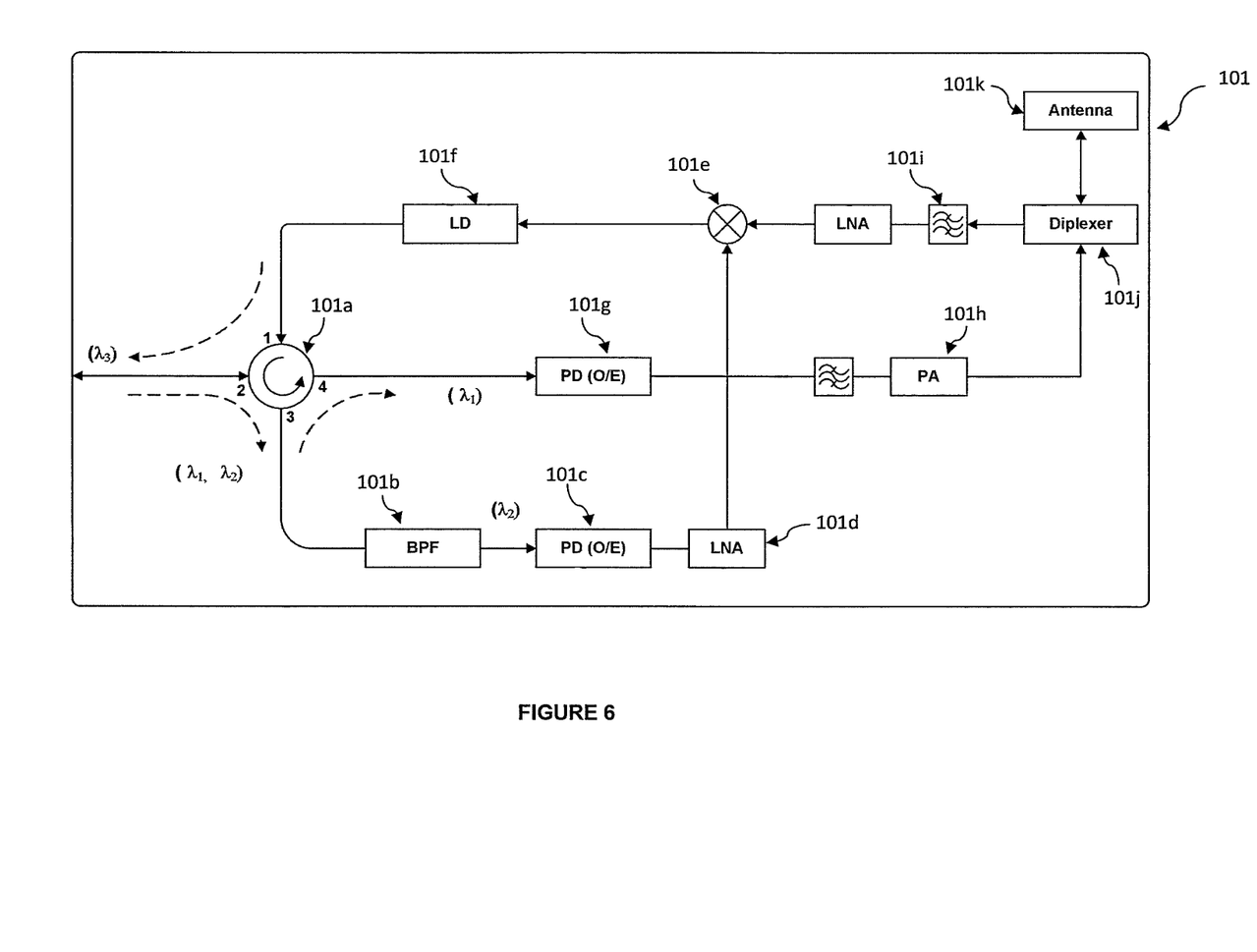
FIG. 6 illustrates the propagation of the downlink and uplink signals in the full duplex transmission.

The band pass filter 101b filters out the other optical signal. The other optical signal may be the downlink optical signal. The downlink optical signal which is retransmitted by the band pass filter 101b exits at the fourth port of the third optical circulator 101a. The downlink optical signal is next converted to a downlink electrical signal by using a second photo detector 101g. After filtration by another electrical filter, the downlink electrical signal is electrically amplified by a power amplifier 101h before being transmitted to the diplexer 101j for transmission via the antenna 101k. FIG. 6 depicts the propagation of the downlink optical signal at the wavelength $\lambda 1$, the laser optical signal at the wavelength $\mu 2$, and the uplink optical signal at wavelength $\lambda 3$ throughout the base station 101.

Figure 7:
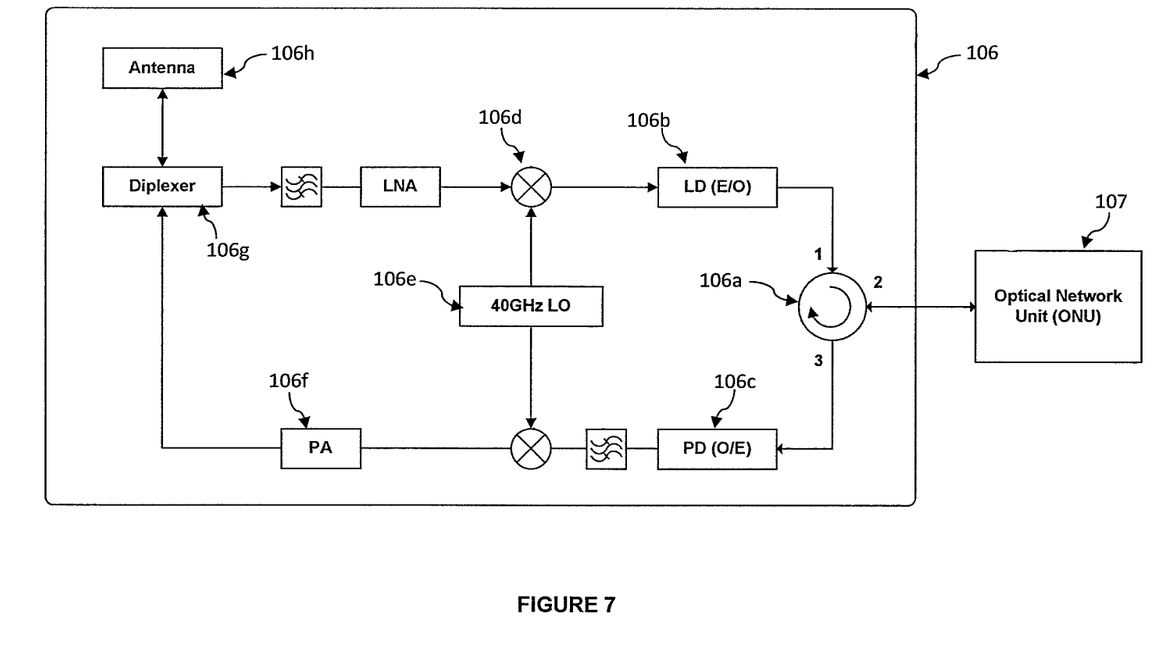
FIG. 7 depicts the component architecture of the equipment in a premise according to the present invention.

The CPE 106 of the system comprises an antenna 106h, a fourth optical circulator 106a, and a 40 GHz local oscillator 106e as shown in FIG. 7. The CPE 106 further comprises a diplexer 106g, a power amplifier 106f, a photo detector 106c, a laser diode 106b. The CPE 106 further comprises a plurality of electrical mixers and a plurality of low noise electrical amplifiers. The optical network unit 107 transmits an optical signal to the fourth optical circulator 106a. Preferably, the fourth optical circulator 106a is a three-port optical circulator. More preferably, the optical signal is received at the second port and exits at the third port of the fourth optical circulator 106a. The optical signal is converted to an electrical signal and being propagated to a band pass filter. The electrical signal is next subjected to the electrical mixer for up conversion which generates a RF carrier for the transmission. The RF carrier or a 40 GHz local oscillator signal is generated by the 40 GHz local oscillator 106e. The uplink signal—comprises the electrical signal and the RF carrier is amplified using the power amplifier 106f before being transmitted to the diplexer 106g. As for the downlink transmission, the downlink electrical signal transmitted from the central station 100 is propagated to another band pass filter and low noise electrical amplifier. The downlink electrical signal is subjected to down conversion by removing a RF carrier in the signal at the mixer 106d to form an intermediate frequency. The laser diode 106b is configured to convert the intermediate frequency into optical domain via a direct modulation. The resulting signal which is a downlink optical signal is transmitted to the fourth optical circulator 106a for a transmission to the optical network unit 107.

While this invention has been particularly shown and described with reference to the exemplary embodiments thereof, it will be understood by those skilled in the art that various changes in form and details may be made therein without departing from the scope of the invention as defined by the appended claims.

The invention claimed is:
1. A system for communication between a radio-over-fiber based network and a fiber-to-the-home network, comprising:
　a central station; and
　a base station connected to the central station by an optical link;
the central station including:
　　a laser diode configured for generating a laser optical signal;
　　a first optical circulator coupled to the laser diode and configured to circulate the laser optical signal and a downlink optical signal received by the central station;

an optical carrier generating unit coupled to the first optical circulator and configured to generate an optical carrier for each of the optical signals; and a second optical circulator coupled to the optical carrier generating unit and configured to circulate the optical signals and/or the optical carrier for transmission through the optical link;

the base station including:

a third optical circulator optically connected to the optical link; and a band pass filter coupled to the third optical circulator and configured to select and pass the laser optical signal, wherein the unselected signal is the downlink optical signal.

2. The system according to claim 1 further comprising:

an optical line terminal connected to the central station and configured to transmit the downlink optical signal; and an optical network unit connected to the base station and configured to transmit an uplink signal; and an optical splitter coupled to the optical link and configured to divide the transmission in accordance with a number of the base station.

3. The system according to claim 1, wherein the central station further comprises includes a band pass filter disposed between the laser diode and the first optical circulator, the band pass filter configured to allow only the laser optical signal to pass.

4. The system according to claim 1, wherein the base station further includes:

a first photo detector coupled to a band pass filter and configured for converting the laser optical signal to a laser electrical signal;

a low noise electrical amplifier coupled to the first photo detector and configured for amplifying the laser electrical signal;

an electrical mixer connected to the low noise amplifier and configured for:

mixing an uplink signal and the laser electrical signal, and converting the uplink signal to an intermediate frequency; and a modulator configured for converting the intermediate frequency to an uplink optical signal in which is inputted to the third optical circulator.

5. The system according to claim 4, wherein the modulator is a laser diode configured for direct modulation.

6. The system according to claim 1, wherein the base station further includes:

a second photo detector coupled to the third optical circulator and configured to convert the downlink optical signal to a downlink electrical signal; and a power amplifier to receive and amplify the downlink electrical signal.

7. The system according to claim 1, wherein the base station further includes:

a plurality of electrical filters;

an electrical diplexer; and an antenna.

8. The system according to claim 1, wherein the optical carrier generating unit includes:

a polarization controller configured to adjust polarization state of the laser optical signal and the downlink optical signal;

a Mach-Zender modulator coupled to the polarization controller and configured to modulate the laser optical signal and the downlink optical signal with a local oscillator signal provided by a local oscillator.

9. The system according to claim 1, wherein the optical carrier generating unit includes:

a power splitter connected to a local oscillator for dividing a local oscillator signal to a ratio of 1:2;

a phase shifter coupled to the power splitter for phase-shifting the laser optical signal and the downlink optical signal; and a broadband optical amplifier coupled to a Mach-Zender modulator and configured to optically amplify the resulting optical signals.

10. The system according to claim 1 further comprises a premise equipment.

11. The system according to claim 1, wherein the laser optical signal and the downlink optical signal have different wavelengths.

12. The system according to claim 1, wherein the first optical circulator is a four-port optical circulator.

13. The system according to claim 1, wherein the second optical circulator is a three-port optical circulator.

14. The system according to claim 1, wherein the third optical circulator is a four-port optical circulator.

15. The method of operating a radio-over-fiber based network in a fiber-to-the-home network, the method comprising:

receiving, at an optical circulator of a central station from an optical line terminal of the central station, a downlink optical signal;

providing, at the central station, a laser optical signal at a wavelength different than that of the downlink optical signal;

generating, by an optical carrier generating unit of the central station, an optical carrier for each of the optical signals;

receiving, at a base station from the central station via an optical link, the optical carriers and the optical signals consisting of the laser optical signal and the downlink optical signal;

converting, at the base station, an uplink signal to an intermediate frequency using the laser optical signal; and transmitting, at the base station, the downlink optical signal.

16. The method according to claim 15 further comprising:

filtering the optical signals;

adjusting polarization states of the optical signals;

providing a local oscillator signal;

phase-shifting the optical signals;

modulating the optical signals with the local oscillator signal; and amplifying the resulting optical signals.

17. The method according to claim 16 including splitting the local oscillator signal to two channels at a ratio of 1:2.

18. The method according to claim 15 further comprising:

converting the laser optical signal to a laser electrical signal;

filtering and amplifying the laser electrical signal;

mixing the laser electrical signal with the uplink signal; and converting the intermediate frequency to an uplink optical signal.

19. The method according to claim 15 further comprising:

converting the downlink optical signal to a downlink electrical signal;

filtering the downlink electrical signal; and amplifying the downlink electrical signal.

* * * * *